(12) United States Patent
Maruta et al.

(10) Patent No.: US 11,608,692 B2
(45) Date of Patent: Mar. 21, 2023

(54) THREADED CONNECTION FOR STEEL PIPES

(71) Applicants: Nippon Steel Corporation, Tokyo (JP); Vallourec Oil and Gas France, Aulnoye-Aymeries (FR)

(72) Inventors: Satoshi Maruta, Tokyo (JP); Yousuke Oku, Tokyo (JP); Tadashi Nakamura, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 325 days.

(21) Appl. No.: 16/612,608

(22) PCT Filed: Apr. 11, 2018

(86) PCT No.: PCT/JP2018/015263
§ 371 (c)(1),
(2) Date: Nov. 11, 2019

(87) PCT Pub. No.: WO2018/211873
PCT Pub. Date: Nov. 22, 2018

(65) Prior Publication Data
US 2021/0156204 A1    May 27, 2021

(30) Foreign Application Priority Data

May 15, 2017  (JP) .............................. JP2017-096651

(51) Int. Cl.
*E21B 17/042*  (2006.01)
*F16L 15/04*   (2006.01)
*F16L 15/00*   (2006.01)

(52) U.S. Cl.
CPC ...... *E21B 17/0423* (2013.01); *E21B 17/0426* (2013.01); *F16L 15/002* (2013.01); *F16L 15/04* (2013.01)

(58) Field of Classification Search
CPC ..... F16L 15/002; F16L 15/04; E21B 17/0423; E21B 17/0426
(Continued)

(56) References Cited

U.S. PATENT DOCUMENTS 2,636,753 A * 4/1953 Griffin ................ E21B 17/0426
3,822,902 A * 7/1974 Maurer ................ E21B 17/042
                                                          285/333

(Continued)

FOREIGN PATENT DOCUMENTS

| JP | H9-126366 A    | 5/1997 |
| JP | 2000-240862 A  | 9/2000 |

(Continued)

OTHER PUBLICATIONS

Jun. 26, 2018 (WO)—International Search Report Application No. PCT/JP2018/015263.
English Abstract of JP-H09-126366.

*Primary Examiner* — Zachary T Dragicevich
(74) *Attorney, Agent, or Firm* — Banner & Witcoff, Ltd.

(57) ABSTRACT

A threaded connection includes a pin and a box. The pin includes, in the order from a free end side of the pin toward a tubular body side thereof, an inner sealing surface, an inner male threaded portion, a shoulder portion, an outer male threaded portion, and an outer sealing surface. The box includes, in the order from a tubular body side of the box toward a free end side thereof, an inner sealing surface, an inner female threaded portion, a shoulder portion, an outer female threaded portion, and an outer sealing surface. Between the inner sealing surface and the inner female threaded portion of the box, an inner groove along a cir- (Continued)

cumferential direction is provided, and some threads of the inner male threaded portion of the pin are contained in the inner groove.

11 Claims, 6 Drawing Sheets

(58) Field of Classification Search
USPC .................................................. 285/333, 334
See application file for complete search history.

(56) References Cited

U.S. PATENT DOCUMENTS

| | | | | |
|---|---|---|---|---|
| 4,770,444 A | * | 9/1988 | Hauk | F16L 15/04 |
| | | | | 285/333 |
| 5,064,224 A | * | 11/1991 | Tai | E21B 17/042 |
| | | | | 285/94 |
| 5,687,999 A | * | 11/1997 | Lancry | F16L 15/002 |
| | | | | 285/333 |
| 6,347,814 B1 | * | 2/2002 | Cerruti | F16L 15/002 |
| | | | | 285/333 |
| 2004/0021314 A1 | * | 2/2004 | Pina | F16L 15/04 |
| | | | | 285/334 |
| 2010/0078936 A1 | | 4/2010 | Nakamura et al. | |
| 2017/0292638 A1 | * | 10/2017 | Sugino | F16L 15/04 |
| 2018/0223606 A1 | * | 8/2018 | Rueda | E21B 17/0423 |

FOREIGN PATENT DOCUMENTS

| | | |
|---|---|---|
| JP | 2006-526747 A | 11/2006 |
| JP | 2010-531418 A | 9/2010 |
| JP | 2011-501075 A | 1/2011 |
| UA | 96796 C2 | 12/2011 |
| WO | 2009044851 A1 | 4/2009 |

* cited by examiner

THREADED CONNECTION FOR STEEL PIPES

TECHNICAL FIELD

The present invention relates to a threaded connection used for coupling steel pipes.

BACKGROUND ART

In an oil well, natural gas well, and the like (hereafter, collectively referred to as an "oil well"), steel pipes called oil country tubular goods (OCTG) are used to mining underground resources. The steel pipes are coupled one by one. For the coupling, threaded connections are used.

Types of the threaded connection for steel pipes are roughly categorized into a coupling type and an integral type. In a case of a threaded connection of the coupling type, one of tubes in a pair to be coupled is a steel pipe, and the other one is a coupling. In this case, male threaded portions are formed on outer circumferences of both end portions of the steel pipe, and female threaded portions are formed on inner circumferences of both end portions of the coupling. The steel pipe and the coupling are then coupled with each other. In a case of a threaded connection of the integral type, tubes in a pair to be coupled are both steel pipes, and a coupling is not used separately. In this case, a male threaded portion is formed on an outer circumference of one end portion of each steel pipe, and a female threaded portion is formed on an inner circumference of the other end portion. One and the other of the steel pipes are then coupled with each other.

A joint portion of a tube leading end portion on which a male threaded portion is formed includes an element to be inserted into a female threaded portion, and thus is called a pin. In contrast, a joint portion of a tube leading end portion on which a female threaded portion is formed includes an element to receive a male threaded portion, and thus is called a box. The pin and the box are end portions of a tube and are therefore both tubular.

Types of the threaded connection for steel pipes can be classified into a flush type, a semi-flush type, a slim type, and the like, according to outer diameters of boxes. A slim-type threaded connection is designed with reference to a coupling whose box has substantially the same area of critical cross section as a tubular body of a pin of the threaded connection (hereafter, also referred to as a "standard coupling"). Specifically, a threaded connection of the slim type includes a box whose maximum outer diameter is smaller than an outer diameter of the standard coupling. Threaded connections of the flush type and the semi-flush type are designed with reference to a tubular body of pins thereof. Specifically, a threaded connection of the flush type includes a box whose maximum outer diameter is substantially the same as an outer diameter of a tubular body of the pin of the threaded connection. A threaded connection of the semi-flush type includes a box whose maximum outer diameter is between that of a threaded connection of the flush type and that of a threaded connection of the slim type. In summary, a threaded connection of the flush type, a threaded connection of the semi-flush type, and a threaded connection of the slim type are in the ascending order of a maximum outer diameter of a box with respect to an outer diameter of a tubular body of a pin. There is no definition to clearly classify threaded connections into the flush type, the semi-flush type, and the slim type. However, a threaded connection for steel pipes currently available in the market is generally called a flush type or a semi-flush type when the threaded connection includes a box whose maximum outer diameter is up to about 110% of an outer diameter of a tubular body of a pin of the threaded connection.

In general, the critical cross section refers to a cross section at a position of an end portion of a mesh region in a threaded portion. In general, at a position of the critical cross section, a cross-sectional area bearing tensile load reaches its minimum. The position and the cross-sectional area of the critical cross section is a factor in determining a tensile strength of the threaded connection.

In recent years, oil wells are increasingly shifted at great depths and to hadal zones. In such an oil well environment, a threaded connection receives a high pressure from fluids (e.g., gas, liquid) existing outside and inside. Furthermore, the threaded connection repeatedly receives tensile load and compressive load. In addition, in the above oil well environment, oil country tubular goods (OCTG) are disposed in a multiplexed manner. To couple oil country tubular goods into a multiple structure, greater use is usually made of threaded connections of the semi-flush type, whose box and pin have almost the same outer diameters. This is because an inner diameter of a pin is regulated by the standard of the API (American Petroleum Institute), and an outer diameter of a box is accordingly limited. Under such a limitation, threaded connections are required to have an excellent sealing performance against pressure from an inside (hereafter, also referred to as "internal pressure") and pressure from an outside (hereafter, also referred to as "external pressure"). Furthermore, the threaded connections are also required to have an excellent sealing performance against tensile load and compressive load.

For example, Japanese Patent Application Publication No. 9-126366 (Patent Literature 1) discloses a threaded connection for steel pipes intended to have an improved sealing performance against internal pressure, external pressure, tensile load, and compressive load. In the threaded connection described in Patent Literature 1, a tapered thread of buttress type is employed as a threaded portion formed by a male threaded portion of a pin and a female threaded portion of a box. This thread part is partitioned off into an inner threaded portion and an outer threaded portion by a shoulder portion. That is, the inner threaded portion is provided on a free end side of the pin. The outer threaded portion is provided on a free end side of the box. Between the inner threaded portion and the outer threaded portion, the shoulder portion is provided. In addition, an inner seal portion is provided on an inner side of the inner threaded portion (a free end side of the pin). An outer seal portion is provided on an outer side of the outer threaded portion (a free end side of the box).

In fastening, by screwing a pin into a box, a shoulder surface included in the shoulder portion of the pin comes into contact with a shoulder surface included in the shoulder portion of the box. Furthermore, a male threaded portion and a female threaded portion of the inner threaded portion fit over each other, and a male threaded portion and a female threaded portion of the outer threaded portion fit over each other. As a result, thread seal parts are formed in the inner threaded portion and the outer threaded portion. In addition, an inner sealing surface included in the internal seal portion of the pin interferes with an inner sealing surface included in the inner seal portion of the box into contact at a high interfacial pressure. An outer sealing surface included in the outer seal portion of the pin interferes with an outer sealing surface included in the outer seal portion of the box into contact at a high interfacial pressure. As a result, seal parts are formed by surface contact in the inner seal portion and the outer seal portion.

The inner seal portion takes mainly a role of preventing fluid present inside the threaded connection from accidentally entering a region of a thread seal part. That is, the inner seal portion contributes to improvement in sealing performance against internal pressure. The outer seal portion takes mainly a role of preventing fluid present outside the threaded connection from accidentally entering the region of the thread seal part. That is, the outer seal portion contributes to improvement in sealing performance against external pressure.

In the threaded connection described in Patent Literature 1, an inner male threaded portion of the pin and an inner female threaded portion of the box that form the inner threaded portion are in mesh with each other over the entire region of the inner threaded portion. However, of a region of the inner female threaded portion of the box, in some region close to the inner seal portion, tips of threads are cut to be parallel to a pipe axis, being formed into incomplete thread whose thread height is low. If the inner female threaded portion in the region is complete thread, there is a risk of damaging the inner sealing surface of the pin in fastening. Nevertheless, even in the region of the incomplete thread, the inner male threaded portion and the inner female threaded portion are in mesh with each other.

Similarly, an outer male threaded portion of the pin and an outer female threaded portion of the box that form the outer threaded portion are in mesh with each other over the entire region of the outer threaded portion. However, of a region of the outer male threaded portion of the pin, in some region close to the outer seal portion, tips of threads are cut to be parallel to the pipe axis, being formed into incomplete thread whose thread height is low. If the outer male threaded portion in the region is complete thread, there is a risk of damaging the outer sealing surface of the box in fastening. Nevertheless, even in the region of the incomplete thread, the outer male threaded portion and the outer female threaded portion are in mesh with each other.

CITATION LIST

Patent Literature

Patent Literature 1: Japanese Patent Application Publication No. 9-126366

SUMMARY OF INVENTION

Technical Problem

In a case of the threaded connection described in Patent Literature 1, the sealing performance remains good as long as the threaded connection is simply subjected to internal pressure, external pressure, tensile load, and compressive load once. However, according to a test conducted by the present inventors, when the threaded connection was repeatedly subjected to, for example, tensile load and internal pressure a certain number of times, internal pressure leakage occurred in the internal seal portion in some cases. That is, the sealing performance of the threaded connection described in Patent Literature 1 is unstable.

An objective of the present invention is to provide a threaded connection for steel pipes having the following characteristics:

To stably ensure a sealing performance even in an environment where the threaded connection is repeatedly subjected to internal pressure, external pressure, tensile load, and compressive load.

Solution to Problem

A threaded connection for steel pipes according to an embodiment of the present invention includes a tubular pin and a tubular box. The pin includes, in the order from a free end side of the pin toward a tubular body side thereof, an inner sealing surface, an inner male threaded portion, a shoulder portion, an outer male threaded portion, and an outer sealing surface. The box includes, in the order from a tubular body side of the box toward a free end side thereof, an inner sealing surface, an inner female threaded portion, a shoulder portion, an outer female threaded portion, and an outer sealing surface. The threaded connection includes at least one of the following configurations (1) and (2):

(1) An inner groove along a circumferential direction is provided between the inner sealing surface and the inner female threaded portion of the box, and some threads of the inner male threaded portion of the pin are contained in the inner groove, and (2) An outer groove along a circumferential direction is provided between the outer sealing surface and the outer male threaded portion of the pin, and some threads of the outer female threaded portion of the box are contained in the outer groove.

Advantageous Effect of Invention

A threaded connection for steel pipes according to an embodiment of the present invention has the following remarkable advantageous effect:

To stably ensure a sealing performance even in an environment where the threaded connection is repeatedly subjected to internal pressure, external pressure, tensile load, and compressive load.

DESCRIPTION OF EMBODIMENTS

In order to achieve the above described objectives, the present inventors prepared samples of various sizes for the threaded connection according to Patent Literature 1, and carried out a test in which the samples were repeatedly subjected to an internal pressure, external pressure, tensile load, and compressive load.

Every sample exhibited internal pressure leakage at an inner seal portion upon subjected to a tensile load and an internal pressure. Moreover, every sample exhibited external pressure leakage at an outer seal portion upon subjected to a tensile load and an external pressure. Further, in some cases, internal pressure leakage and external pressure leakage occurred when a compressive load was applied. Therefore, it was inferred that internal pressure leakage and external pressure leakage occurred due to the design of thread shape.

A threaded connection which exhibited internal pressure leakage was then disassembled to investigate each of the pin and the box precisely. Similarly, a threaded connection which exhibited external pressure leakage was disassembled to investigate each of the pin and the box precisely.

Figure 1A:
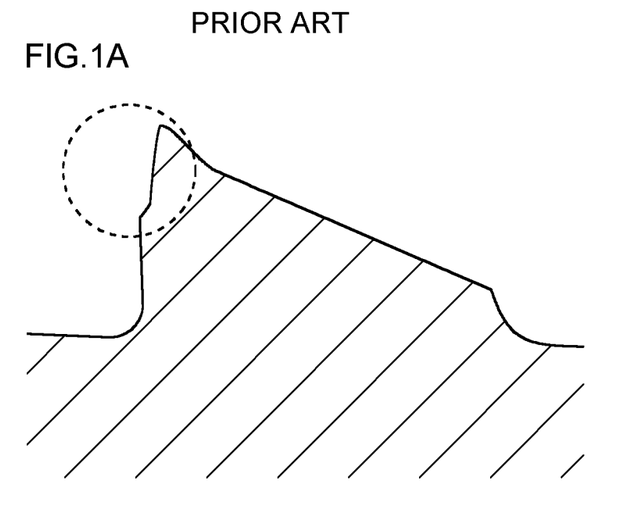
FIG. 1A is a schematic diagram to show observation of a longitudinal section of an inner male threaded portion in a proximity of an inner seal portion of a threaded connection in which internal pressure leakage has occurred.
Figure 1B:
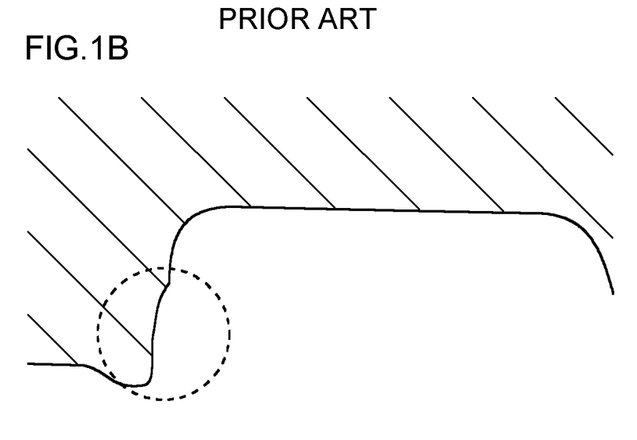
FIG. 1B is a schematic diagram to show observation of a longitudinal section of an inner female threaded portion in a proximity of an inner seal portion of a threaded connection in which internal pressure leakage has occurred.

FIG. 1A and FIG. 1B are each a schematic diagram to show an example of observation of a longitudinal section of an inner threaded portion in a proximity of an inner seal portion of a threaded connection in which internal pressure leakage occurred. Where, FIG. 1A shows a part of the inner male threaded portion of a pin, and FIG. 1B shows a part of the inner female threaded portion of a box. Note that sectional observation of the inner threaded portion of each of the pin and the box was performed at each position at an interval of 90° around the pipe axis (conveniently represented as 0°, 90°, 180° and 270°, respectively). FIG. 1A shows a condition at a position of 180°, and FIG. 1B shows a condition at a position of 270°.

As shown by a dotted line circle in FIG. 1A, a tip part of a load flank was deformed in the inner male threaded portion in a proximity of the inner seal portion. That is, in the inner male threaded portion in the proximity of the inner seal portion, traces of excessive load applied to the tip part of the load flank were recognized. As shown by a dotted line circle in FIG. 1B, a similar phenomenon occurred in the inner female threaded portion in the proximity of the inner seal portion as well.

Moreover, although not shown in the figure, in a case of a threaded connection in which external pressure leakage occurred, traces of excessive load applied to the tip part of the load flank were recognized in an outer male threaded portion in a proximity of an outer seal portion. On the other hand, in an outer female threaded portion in the proximity of the outer seal portion, traces of excessive load applied to the tip part of the load flank were recognized.

In summary, in a case of a threaded connection in which internal pressure leakage occurred, it was found that in a proximity of the inner seal portion, some threads (particularly, load flanks) of the inner male threaded portion of the pin inappropriately interfere with the inner female threaded portion of the box. In the case of a threaded connection in which external pressure leakage occurred, it was found that in a proximity of the outer seal portion, some threads (particularly, load flanks) of the outer female threaded portion of the box inappropriately interfere with the outer male threaded portion of the pin.

Accordingly, the present inventors focused on inappropriate interference of the inner threaded portion in a proximity of the inner seal portion, and investigated the mechanism of occurrence of internal pressure leakage due to such interference. Further, the present inventors focused on inappropriate interference of the outer threaded portion in a proximity of the outer seal portion, and investigated the mechanism of occurrence of external pressure leakage due to such interference.

Figure 2A:
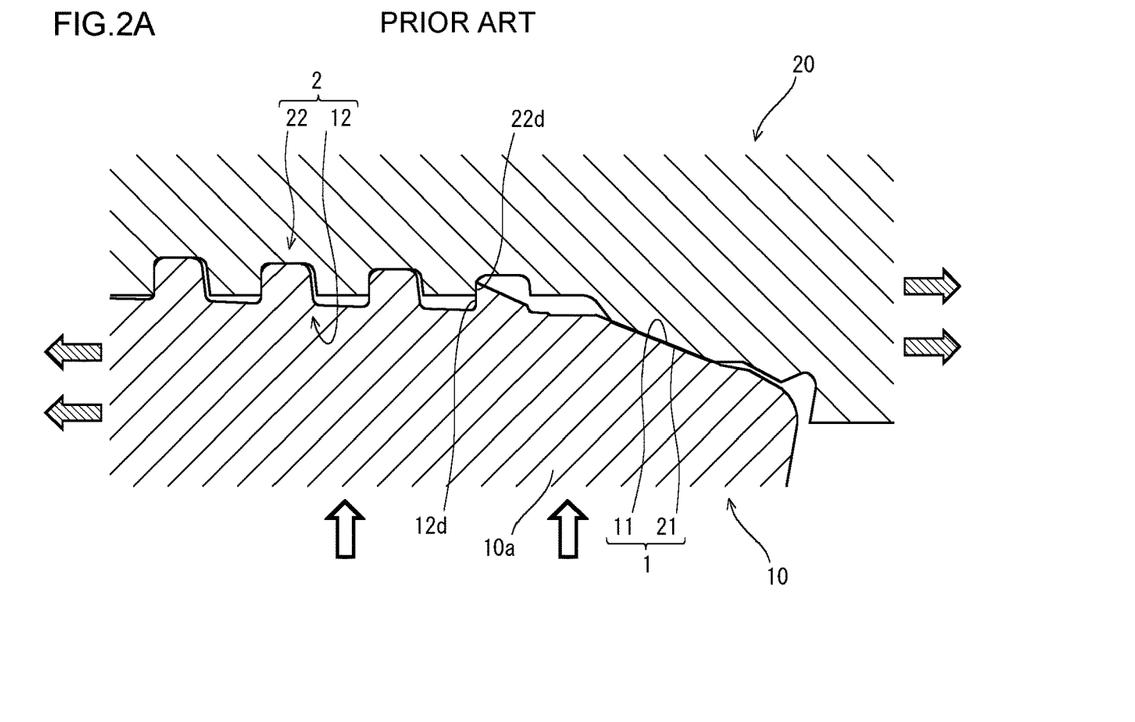
FIG. 2A is a longitudinal sectional view to show an inner seal portion and a vicinity thereof in a threaded connection in which internal pressure leakage has occurred.
Figure 2B:
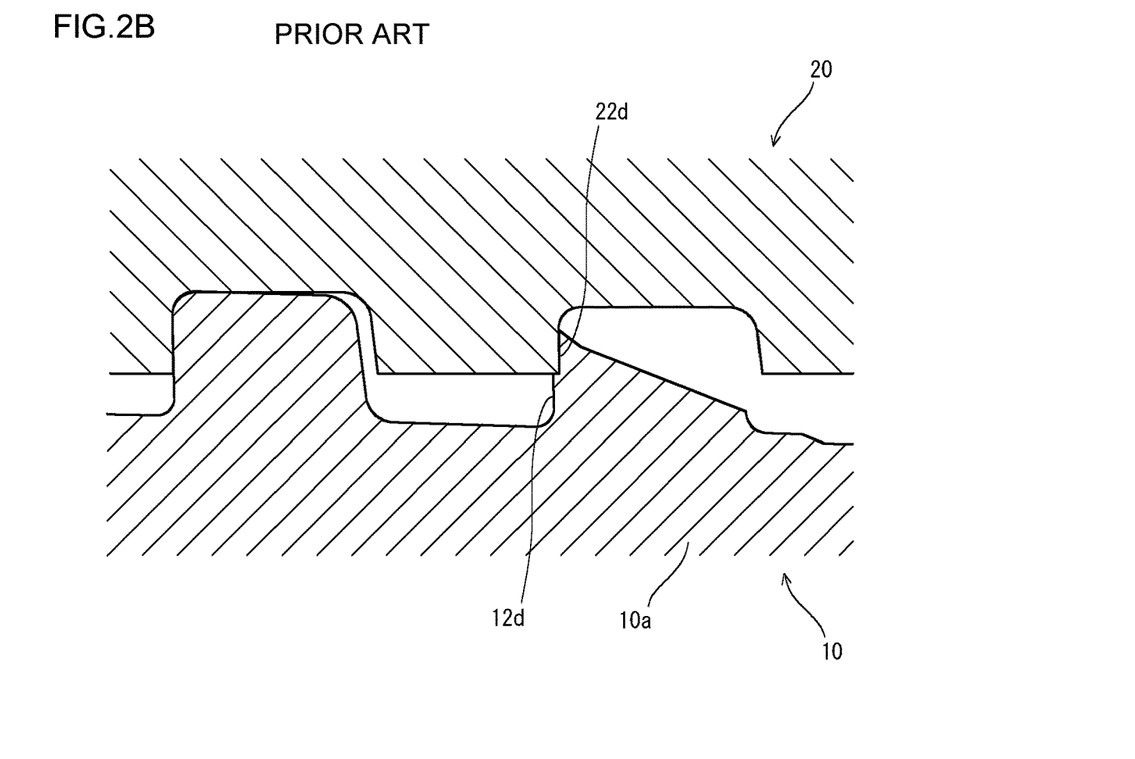
FIG. 2B is an enlarged longitudinal sectional view of an inner threaded portion in a vicinity of the inner seal portion of FIG. 2A.

FIGS. 2A and 2B are each a schematic diagram to illustrate the mechanism of occurrence of internal pressure leakage. Where, FIG. 2A is a longitudinal sectional view to show an inner seal portion and a vicinity thereof in a threaded connection. FIG. 2B is an enlarged longitudinal sectional view of the inner threaded portion in the vicinity of the inner seal portion of FIG. 2A.

Referring to FIGS. 2A and 2B, in the threaded connection according to Patent Literature 1, the free end portion 10a of the pin 10 is elastically deformed to be expanded in diameter when internal pressure is applied thereto (see hollow arrows in FIG. 2A). In particular, a part of the inner female threaded portion 22 in a proximity of the inner seal portion 1 is an incomplete thread whose thread height is low. For that reason, even if the incomplete thread is in mesh with the inner male threaded portion 12, the free end portion 10a of the pin 10 can deform so as to be expanded in diameter until crests and roots of each other come into contact with each other. As a result, the contact surface pressure of the inner seal portion 1 increases (see hollow arrows in FIG. 2A), thus improving sealing performance against internal pressure.

However, when internal pressure is unloaded (a state in which there is no hollow arrow in FIG. 2A), the free end portion 10a of the pin 10 is restored so as to be reduced in diameter. As a result, as shown in FIG. 2B, the tip part of the load flank 22d of the incomplete thread (a part of the inner female threaded portion 22) and the tip part of the load flank 12d of the inner male threaded portion 12 come into contact with each other. This contact area is narrow. If tensile load is applied at this moment (see shaded arrows in FIG. 2A), an excessive load is applied to a tip part of each of the load flanks 12d and 22d. As a result, the tip part of each of the load flanks 12d and 22d is deformed, and further some of the threads of the deformed inner male threaded portion 12 comes to ride on some of the threads (incomplete thread) of the inner female threaded portion 22 of the box 20. Once such a condition has occurred, the diameter expansion deformation of the free end portion 10a of the pin 10 is kept restricted even if internal pressure is applied next. Therefore, the contact surface pressure of the inner seal portion 1 will not increase. As a result, the sealing performance against internal pressure will deteriorate.

Figure 3A:
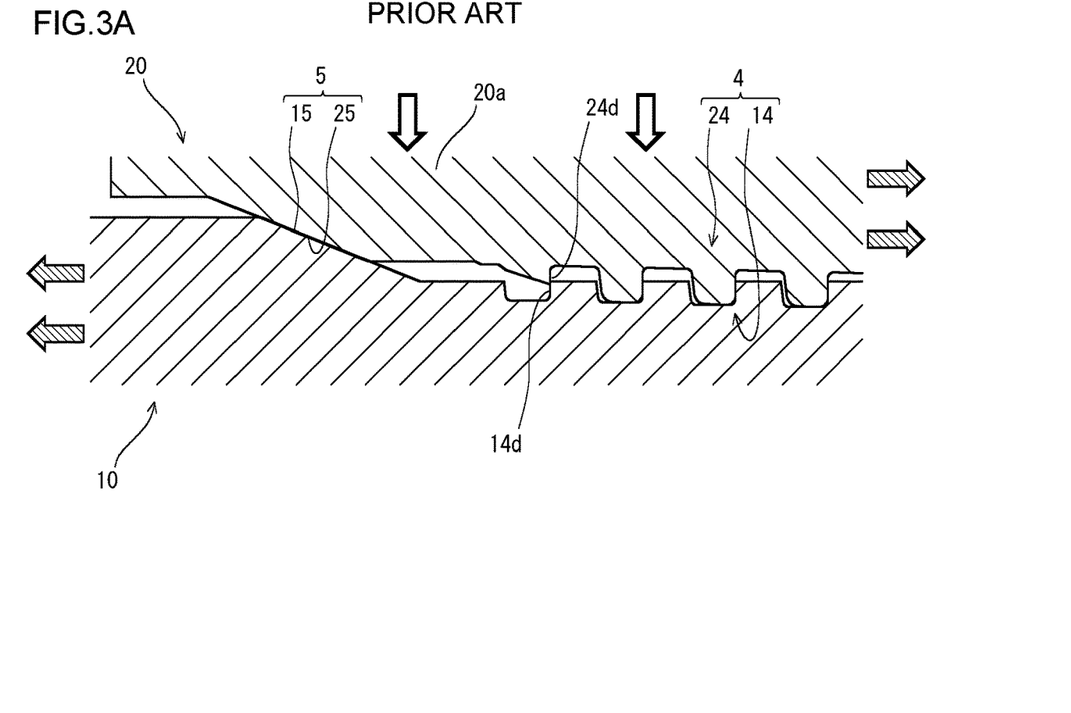
FIG. 3A is a longitudinal sectional view to show an outer seal portion and a vicinity thereof in a threaded connection in which external pressure leakage has occurred.
Figure 3B:
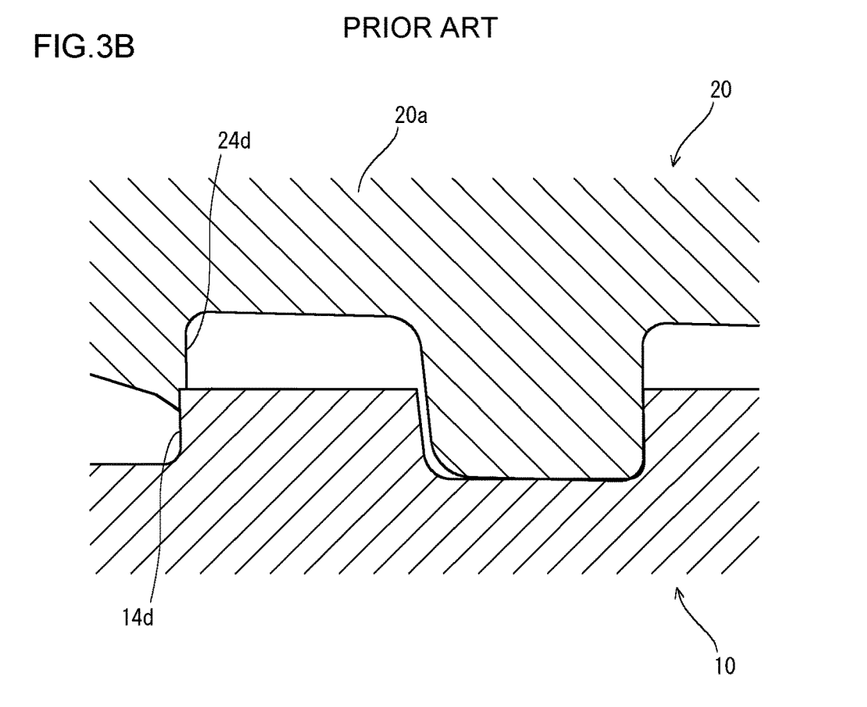
FIG. 3B is an enlarged longitudinal sectional view of an outer threaded portion in a vicinity of the outer seal portion of FIG. 3A.

FIGS. 3A and 3B are schematic diagrams to illustrate the mechanism of occurrence of external pressure leakage. Where, FIG. 3A is a longitudinal sectional view to show an outer seal portion and a vicinity thereof in a threaded connection. FIG. 3B is an enlarged longitudinal sectional view of an outer threaded portion in a vicinity of the outer seal portion of FIG. 3A.

Referring to FIGS. 3A and 3B, in the case of the threaded connection according to Patent Literature 1, the free end portion 20a of the box 20 is elastically deformed so as to be reduced in diameter upon subjected to external pressure (see hollow arrows in FIG. 3A). In particular, a part of the outer male threaded portion 14 in a proximity of the outer seal portion 5 is incomplete thread whose thread height is low. For that reason, even if the incomplete thread is in mesh with the outer female threaded portion 24, the free end portion 20a of the box 20 can deform so as to be reduced in diameter until the crests and the roots of each come into contact with each other. As a result, the contact surface pressure of the outer seal portion 5 increases (see hollow arrows in FIG. 3A), thus improving sealing performance against external pressure.

However, when external pressure is unloaded (a state in which there is no hollow arrow in FIG. 3A), the free end portion 20a of the box 20 is restored so as to be expanded in diameter. As a result, as shown in FIG. 3B, the tip part of the load flank 14d of the incomplete thread (a part of the outer male threaded portion 14) and the tip part of the load flank 24d of the outer female threaded portion 24 come into contact with each other. This contact area is narrow. If tensile load is applied at this moment (see shaded arrows in FIG. 3A), an excessive load is applied to tip part of each of the load flanks 14d and 24d. As a result, the tip part of each of the load flanks 14d and 24d is deformed, and further some threads of the deformed outer female threaded portion 24 comes to ride on some threads (incomplete thread) of the outer male threaded portion 14 of the pin 10. Once such a condition has occurred, the diameter reduction deformation of the free end portion 20a of the box 20 is kept restricted even if external pressure is applied next. Therefore, the contact surface pressure of the outer seal portion 5 will not increase. As a result, the sealing performance against external pressure will deteriorate.

From what has been described so far, it can be said that if in a proximity of the inner seal portion, some threads of the inner male threaded portion of the pin can be prevented from riding on the threads of the inner female threaded portion of the box, the sealing performance against internal pressure can be stably ensured. Moreover, it can be said that if in a proximity of the outer seal portion, some threads of the outer female threaded portion of the box can be prevented from riding on the threads of the outer male threaded portion of the pin, sealing performance against external pressure can be stably ensured.

The threaded connection for steel pipes according to the present invention is completed based on the above findings.

A threaded connection for steel pipes according to an embodiment of the present invention includes a tubular pin and a tubular box. The pin includes, in the order from a free end side of the pin toward a tubular body side thereof, an inner sealing surface, an inner male threaded portion, a shoulder portion, an outer male threaded portion, and an outer sealing surface. The box includes, in the order from a tubular body side of the box toward a free end side thereof, an inner sealing surface, an inner female threaded portion, a shoulder portion, an outer female threaded portion, and an outer sealing surface. The threaded connection includes at least one of the following configurations (1) and (2):
(1) An inner groove along a circumferential direction is provided between the inner sealing surface and the inner female threaded portion of the box, and some threads of the inner male threaded portion of the pin are contained in the inner groove, and (2) An outer groove along a circumferential direction is provided between the outer sealing surface and the outer male threaded portion of the pin, and some threads of the outer female threaded portion of the box are contained in the outer groove.

With such a threaded connection, when the above configuration (1) is employed, in a proximity of the inner seal portion made by contact between the inner sealing surface of the pin and the inner sealing surface of the box, some threads (particularly, load flanks) of the inner male threaded portion of the pin can be prevented from inappropriately interfering with the inner female threaded portion of the box. This is because although threads of the inner male threaded portion are present in the proximity of the inner seal portion, there is no inner female threaded portion to be in mesh with these threads of the inner male threaded portion. As a result, even when the threaded connection is subjected to tensile load and internal pressure, some threads of the inner male threaded portion of the pin can be prevented from riding on the threads of the inner female threaded portion of the box. As a result, lowering of contact interfacial pressure in the internal seal portion is inhibited, and sealing performance against internal pressure can be stably ensured.

In contrast, when the above configuration (2) is employed, in a proximity of the outer seal portion made by contact between the outer sealing surface of the pin and the outer sealing surface of the box, some threads (particularly, load flanks) of the outer female threaded portion of the box can be prevented from inappropriately interfering with the outer male threaded portion of the pin. This is because although threads of the outer female threaded portion are present in the proximity of the outer seal portion, there is no outer male threaded portion to be in mesh with these threads of the outer female threaded portion. As a result, even when the threaded connection is subjected to tensile load and external pressure, some threads of the outer female threaded portion of the box can be prevented from riding on the threads of the outer male threaded portion of the pin. As a result, lowering of contact interfacial pressure in the outer seal portion is inhibited, and sealing performance against external pressure can be stably ensured. To stably ensure the sealing performance against both of internal pressure and external pressure, it will suffice to employ both of the above configurations (1) and (2).

As a typical example, a threaded connection according to the present embodiment is a threaded connection of the integral type. The type of the threaded connection is however not limited to a particular type and may be of the coupling type.

As a typical example, a threaded connection according to the present embodiment is what is called a threaded connection of the semi-flush type or the flush type. That is, an outer diameter of the box is more than 100% and not more than 110% of an outer diameter of the tubular body of the pin. The type of the threaded connection is however not limited to a particular type and may be of the slim type.

As a typical example, a threaded portion consisting of the inner male threaded portion and the inner female threaded portion, and a threaded portion consisting of the outer male threaded portion and the outer female threaded portion are each a tapered thread of buttress type. In this case, each of the tapered threads includes crests, roots, stabbing flanks, and load flanks. The crests of the inner male threaded portion and the roots of the inner female threaded portion are then in contact with each other, and the load flanks of the inner male threaded portion and the load flanks of the inner female threaded portion are in contact with each other. The roots of the outer male threaded portion and the crests of the outer female threaded portion are in contact with each other, and the load flanks of the outer male threaded portion and the load flanks of the outer female threaded portion are in contact with each other. A flank angle of the load flanks is a negative angle.

Note that a mesh state between the inner male threaded portion and the inner female threaded portion, and a mesh state between the outer male threaded portion and the outer female threaded portion are not particularly limited as long as the load flanks are in contact with each other. For example, instead of the contact between the crests of the inner male threaded portion and the roots of the inner female threaded portion, the roots of the inner male threaded portion and the crests of the inner female threaded portion may be in contact with each other. Instead of the contact between the roots of the outer male threaded portion and the crests of the outer female threaded portion, the crests of the outer male threaded portion and the roots of the outer female threaded portion may be in contact with each other.

In the above threaded connection, a length along a pipe axis of the inner groove of the box is preferably larger than a thread pitch of the inner female threaded portion. The length of the inner groove used herein is a length measured from an end portion of the inner sealing surface. A length along the pipe axis of the outer groove of the pin is preferably larger than a thread pitch of the outer male threaded portion. The length of the outer groove used herein is a length measured from an end portion of the outer sealing surface.

In the threaded connection of this case, the length along the pipe axis of the inner groove of the box is preferably not more than 4 times of the thread pitch of the inner female threaded portion. The length is more preferably not more than 2.5 times of the thread pitch. As a result, a length of the mesh between the inner male threaded portion and the inner female threaded portion can be ensured. In addition, the length along the pipe axis of the outer groove of the pin is preferably not more than 4 times of the thread pitch of the outer male threaded portion. The length is more preferably not more than 2.5 times of the thread pitch. As a result, a length of mesh between the outer male threaded portion and the outer female threaded portion can be ensured. As a result, a tensile load tolerated in the threaded connection is not lowered.

In the above threaded connection, a depth of the inner groove of the box is preferably not less than a thread height of the inner female threaded portion, and not more than twice the thread height. The depth of the inner groove used herein is a depth from a crest assuming that the inner female threaded portion is extended to a region of the inner groove. As a result, an area of a critical cross section of the box can be ensured. In addition, a depth of the outer groove of the pin is preferably not less than a thread height of the outer male threaded portion, and not more than twice the thread height. The depth of the outer groove used herein is a depth from a crest assuming that the outer male threaded portion is extended to a region of the outer groove. As a result, an area of a critical cross section of the pin can be ensured.

A shape of the inner groove of the box is not particularly limited. For example, the inner groove may include a cylindrical surface parallel to the pipe axis. In addition, the inner groove may include a tapered surface whose diameter decreases as the tapered surface extends to the inner sealing surface. This tapered surface is adjacent to the inner sealing surface. A taper angle of this tapered surface is larger than 0° and smaller than 90°. However, when this taper angle is too small, it may be difficult to ensure the area of the critical cross section of the box. In contrast, when this taper angle is too large, stress concentration may occur. For that reason, this taper angle of the tapered surface is preferably not less than 1° and not more than 50°. The taper angle is more preferably not less than 1° and not more than 30°, and still more preferably not more than 3° and not less than 15°. This taper angle of the tapered surface may be the same as a taper angle of the inner female threaded portion.

In addition, the inner groove may include a tapered surface whose diameter decreases as the tapered surface extends to the inner female threaded portion. This tapered surface is adjacent to the inner female threaded portion. A taper angle of this tapered surface is larger than 0° and smaller than 90°. However, when this taper angle is too small, it may be difficult to ensure the length of the mesh between the inner male threaded portion and the inner female threaded portion. In contrast, when this taper angle is too large, stress concentration may occur. For that reason, this taper angle of the tapered surface is preferably not less than 5° and not more than 45°. The taper angle is more preferably not less than 10° and not more than 30°.

Similarly, a shape of the outer groove of the pin is not particularly limited. For example, the outer groove may include a cylindrical surface parallel to the pipe axis. In addition, the outer groove may include a tapered surface whose diameter increases as the tapered surface extends to the outer sealing surface. This tapered surface is adjacent to the outer sealing surface. A taper angle of this tapered surface is larger than 0° and smaller than 90°. However, if this taper angle is too small, it may be difficult to ensure the area of the critical cross section of the pin. In contrast, when this taper angle is too large, stress concentration may occur. For that reason, this taper angle of the tapered surface is preferably not less than 1° and not more than 50°. The taper angle is more preferably not less than 1° and not more than 30°, and still more preferably not more than 3° and not less than 15°. This taper angle of the tapered surface may be the same as the taper angle of the outer male threaded portion.

In addition, the outer groove may include a tapered surface whose diameter increases as the tapered surface extends to the outer male threaded portion. This tapered surface is adjacent to the outer male threaded portion. A taper angle of this tapered surface is larger than 0° and smaller than 90°. However, when this taper angle is too small, it may be difficult to ensure the length of the mesh between the outer male threaded portion and the outer female threaded portion. In contrast, when this taper angle is too large, stress concentration may occur. For that reason, this taper angle of the tapered surface is preferably not less than 5° and not more than 45°. The taper angle is more preferably not less than 10° and not more than 30°.

Hereafter, a specific example of a threaded connection for steel pipes according to the present embodiment will be described with reference to the accompanying drawings.

Figure 4:
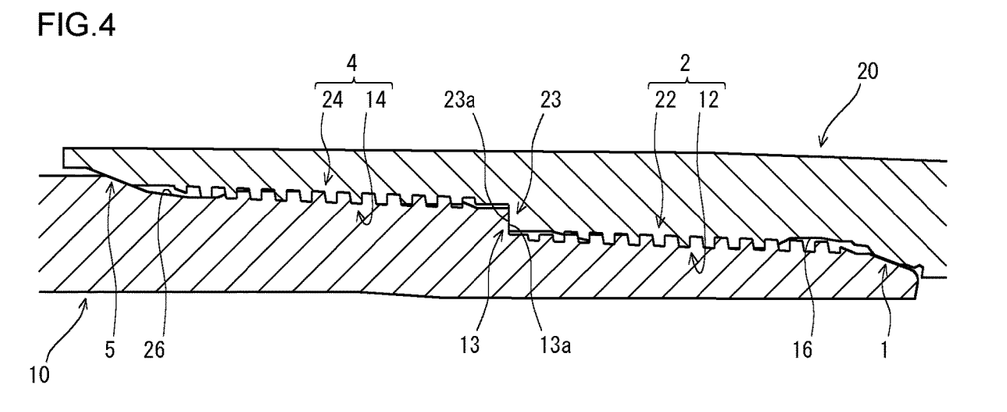
FIG. 4 is a longitudinal sectional view of a threaded connection for steel pipes according to the present embodiment.
Figure 5:
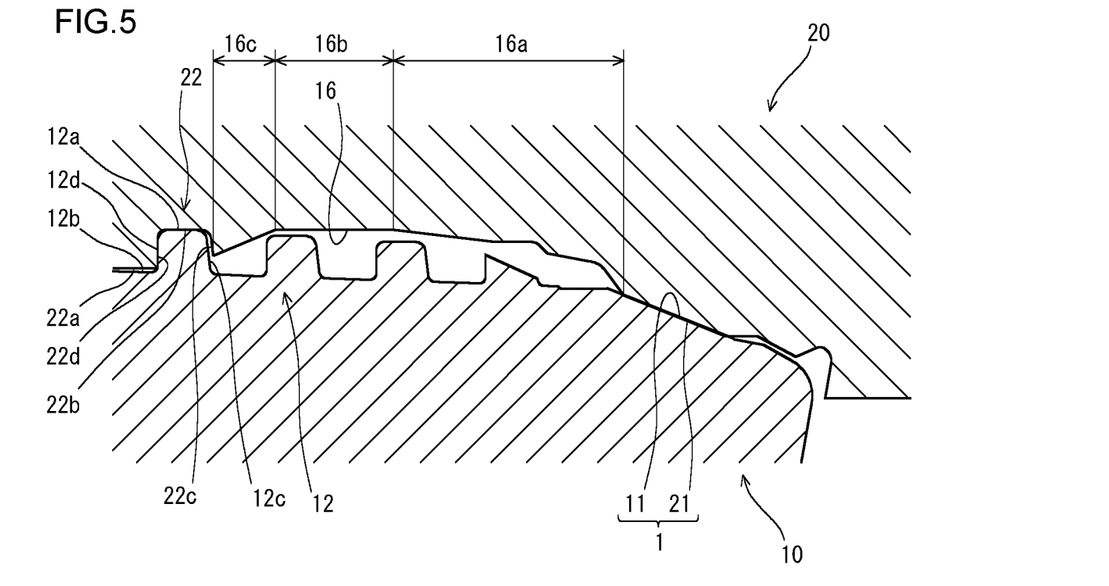
FIG. 5 is a longitudinal sectional view to show an inner seal portion and a vicinity thereof in the threaded connection shown in FIG. 4.
Figure 6:
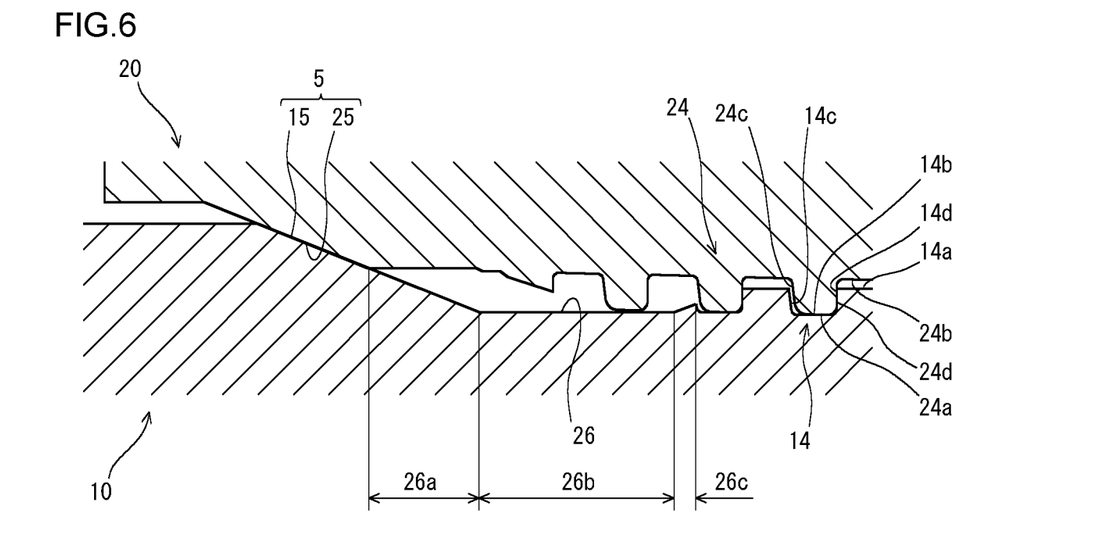
FIG. 6 is a longitudinal sectional view to show an outer seal portion and a vicinity thereof in the threaded connection shown in FIG. 4.

FIG. 4 is a longitudinal sectional view of the threaded connection for steel pipes according to the present embodiment. FIG. 5 is a longitudinal sectional view to show an inner seal portion and a vicinity thereof in the threaded connection shown in FIG. 4. FIG. 6 is a longitudinal sectional view to show an outer seal portion and a vicinity thereof in the threaded connection shown in FIG. 4. As shown in FIG. 4 to FIG. 6, the threaded connection according to the present embodiment is a threaded connection of the integral type and includes a pin 10 and a box 20.

The pin 10 includes, in the order from a free end side of the pin 10 toward a tubular body side thereof, an inner sealing surface 11, an inner male threaded portion 12, a shoulder portion 13, an outer male threaded portion 14, and an outer sealing surface 15. The box 20 includes, in the order from a tubular body side of the box 20 toward a free end side thereof, an inner sealing surface 21, an inner female threaded portion 22, a shoulder portion 23, an outer female threaded portion 24, and an outer sealing surface 25. The inner sealing surface 21, the inner female threaded portion 22, the shoulder portion 23, the outer female threaded portion 24, and the outer sealing surface 25 of the box 20 are provided respectively corresponding to the inner sealing surface 11, the inner male threaded portion 12, the shoulder portion 13, the outer male threaded portion 14, and the outer sealing surface 15 of the pin 10.

The inner male threaded portion 12 of the pin 10 and the inner female threaded portion 22 of the box 20 are tapered threads of buttress type being in mesh with each other and form an inner threaded portion 2 close to an inside (close to the free end side of the pin 10). The outer male threaded portion 14 of the pin 10 and the outer female threaded portion 24 of the box 20 are tapered threads of buttress type being in mesh with each other and form an outer threaded portion 4 close to an outside (close to the free end side of the box 20).

The shoulder portion 13 of the pin 10 includes a shoulder surface 13a. The shoulder portion 23 of the box 20 includes a shoulder surface 23a. The shoulder surfaces 13a and 23a are annular surfaces substantially orthogonal to a pipe axis. The shoulder surfaces 13a and 23a may be formed as annular surfaces inclining from a plane orthogonal to the pipe axis toward a forward-screwing direction of the pin 10. That is, the shoulder surfaces 13a and 23a may incline more toward the free end side of the pin 10 as extending toward outer circumference sides thereof.

Between the inner threaded portion 2 and the outer threaded portion 4, the shoulder portions 13 and 23 are disposed. With the shoulder portions 13 and 23, a tapered surface of the inner threaded portion 2 and a tapered surface of the outer threaded portion 4 are not flush with each other.

In the inner threaded portion 2, the inner male threaded portion 12 of the pin 10 includes a crest 12a, a root 12b, a stabbing flank 12c to lead the inner male threaded portion 12 in screwing, and a load flank 12d laying on an opposite side to the stabbing flank 12c. The inner female threaded portion 22 of the box 20 includes a crest 22a, a root 22b, a stabbing flank 22c, and a load flank 22d. The crest 12a of the inner male threaded portion 12 faces the root 22b of the inner female threaded portion 22. The root 12b of the inner male threaded portion 12 faces the crest 22a of the inner female threaded portion 22. The stabbing flank 12c of the inner male threaded portion 12 faces the stabbing flank 22c of the inner female threaded portion 22. The load flank 12d of the inner male threaded portion 12 faces the load flank 22d of the inner female threaded portion 22. Flank angles of the load flanks 12d and 22d are negative angles, and in a fastening state, the load flanks 12d and 22d are strongly pressed against each other. Flank angles of the stabbing flanks 12c and 22c may be either positive angles or negative angles.

Similarly, in the outer threaded portion 4, the outer male threaded portion 14 of the pin 10 includes a crest 14a, a root 14b, a stabbing flank 14c to lead the outer male threaded portion 14 in screwing, and a load flank 14d laying on an opposite side to the stabbing flank 14c. The outer female threaded portion 24 of the box 20 includes a crest 24a, a root 24b, a stabbing flank 24c, and a load flank 24d. The root 14a of the outer male threaded portion 14 faces the crest 24b of the outer female threaded portion 24. The root 14b of the outer male threaded portion 14 faces the crest 24a of the outer female threaded portion 24. The stabbing flank 14c of the outer male threaded portion 14 faces the stabbing flank 24c of the outer female threaded portion 24. The load flank 14d of the outer male threaded portion 14 faces the load flank 24d of the outer female threaded portion 24. Flank angles of the load flanks 14d and 24d are negative angles, and in a fastening state, the load flanks 14d and 24d are strongly pressed against each other. Flank angles of the stabbing flanks 14c and 24c may be either positive angles or negative angles.

The inner sealing surfaces 11 and 21, and the outer sealing surfaces 15 and 25 are all tapered. To be exact, the inner sealing surfaces 11 and 21, and the outer sealing surfaces 15 and 25 are each in a shape formed by a surface equivalent to a circumferential surface of a truncated cone whose diameter decreases as the truncated cone extends toward the free end side of the pin 10, or in a shape formed by combining the circumferential surface of the truncated cone and a circumferential surface of a solid of revolution obtained by rotating a curve such as an arc about the pipe axis.

In the fastening state, the inner male threaded portion 12 and the inner female threaded portion 22 fit over each other. That is, the root 12b of the inner male threaded portion 12 comes in contact with the crest 22a of the inner female threaded portion 22. The load flank 12d of the inner male threaded portion 12 comes into contact with the load flank 22d of the inner female threaded portion 22. Between the crest 12a of the inner male threaded portion 12 and the root 22b of the inner female threaded portion 22, a gap is formed. Between the stabbing flank 12c of the inner male threaded portion 12 and the stabbing flank 22c of the inner female threaded portion 22, a gap is formed. In these gaps, lubricant is filled. As a result, a thread seal part is formed in the inner threaded portion 2.

In addition, the outer male threaded portion 14 and the outer female threaded portion 24 fit over each other. That is, the crest 14a of the outer male threaded portion 14 comes in contact with the root 24b of the outer female threaded portion 24. The load flank 14d of the outer male threaded portion 14 comes into contact with the load flank 24d of the outer female threaded portion 24. Between the root 14b of the outer male threaded portion 14 and the crest 24a of the outer female threaded portion 24, a gap is formed. Between the stabbing flank 14c of the outer male threaded portion 14 and the stabbing flank 24c of the outer female threaded portion 24, a gap is formed. In these gaps, lubricant is filled. As a result, a thread seal part is formed in the outer threaded portion 4.

The inner sealing surface 11 of the pin 10 interferes with the inner sealing surface 21 of the box 20 into contact at a high interfacial pressure. As a result, a seal part is formed by surface contact in the internal seal portion 1. The outer sealing surface 15 of the pin 10 interferes with the outer sealing surface 25 of the box 20 into contact at a high interfacial pressure. As a result, a seal part is formed by surface contact in the outer seal portion 5.

The shoulder surfaces 13a and 23a come into contact with and are pressed against each other as the pin 10 is screwed into the box 20. In the fastening state, a fastening axial tension is given to the load flanks 12d and 14d of the inner male threaded portion 12 and the outer male threaded portion 14 of the pin 10.

Here, in the present embodiment, an inner groove 16 along a circumferential direction is provided on an inner circumference of the box 20. Specifically, the inner groove 16 is provided between the inner sealing surface 21 and the inner female threaded portion 22 of the box 20. In a proximity of the inner sealing surface 21 (the internal seal portion 1), threads of the inner male threaded portion 12 are present, but these threads of the inner male threaded portion 12 are contained in the inner groove 16. That is, in the proximity, the inner female threaded portion 22 is not in mesh with any of the threads of the inner male threaded portion 12. For that reason, in the proximity of the inner seal portion 1, some threads of the inner male threaded portion 12 of the pin 10 can be prevented from inappropriately interfering with the inner female threaded portion 22 of the box 20. As a result, even when the threaded connection is subjected to tensile load and internal pressure, some threads of the inner male threaded portion 12 of the pin 10 can be prevented from riding on the threads of the inner female threaded portion 22 of the box 20. As a result, lowering of contact interfacial pressure in the internal seal portion 1 is inhibited, and sealing performance against internal pressure can be stably ensured.

In addition, in the present embodiment, an outer groove 26 along a circumferential direction is provided on an outer circumference of the pin 10. Specifically, the outer groove 26 is provided between the outer sealing surface 15 and the outer male threaded portion 14 of the pin 10. In a proximity of the outer sealing surface 15 (the outer seal portion 5), threads of the outer female threaded portion 24 are present, but these threads of the outer female threaded portion 24 are contained in the outer groove 26. That is, in the proximity, the outer male threaded portion 14 is not in mesh with any of the threads of the outer female threaded portion 24. For that reason, in the proximity of the outer seal portion 5, some threads of the outer female threaded portion 24 of the box 20 can be prevented from inappropriately interfering with the outer male threaded portion 14 of the pin 10. As a result, even when the threaded connection is subjected to tensile load and external pressure, some threads of the outer female threaded portion 24 of the box 20 can be prevented from riding on the threads of the outer male threaded portion 14 of the pin 10. As a result, lowering of contact interfacial pressure in the outer seal portion 5 is inhibited, and sealing performance against external pressure can be stably ensured.

The inner groove 16 according to the present embodiment includes, in the order from an inner sealing surface 21 side toward the inner female threaded portion 22, a first tapered surface 16a, a cylindrical surface 16b, and a second tapered surface 16c. The first tapered surface 16a has a taper angle of 6°. This taper angle is the same as a taper angle of the inner female threaded portion 22. The second tapered surface 16c has a taper angle of 15°.

The outer groove 26 according to the present embodiment includes, in the order from an outer sealing surface 15 side toward the outer male threaded portion 14, a first tapered surface 26a, a cylindrical surface 26b, and a second tapered surface 26c. The first tapered surface 26a has a taper angle of 6°. This taper angle is the same as a taper angle of the outer male threaded portion 14. The second tapered surface 26c has a taper angle of 15°.

It should be appreciated that the present invention is not limited to the embodiment described above, and various modifications may be made without departing from the gist and scope of the present invention.

EXAMPLE

Numerical simulation analysis by an elastoplastic finite element method (FEM analysis) was conducted to confirm advantageous effects of the present invention.

[Test Conditions]

In the FEM analysis, a model of a threaded connection for steel pipes shown in FIG. 4 was created. As a comparative example, a model was created in which an inner female threaded portion was extended over a region of an inner groove, and an outer male threaded portion was extended over a region of an outer groove, that is, a model of the threaded connection for steel pipes according to Patent Literature 1.

Main characteristics regarding the material and dimensions of steel pipe were as follows:
Dimensions of steel pipe: 13⅝ [inch], 88.2 [lb/ft] (outer diameter of 346.1 mm, and wall thickness of 15.9 mm),
Grade of steel pipe: Q125 of the API standard (carbon steel for oil well pipe defined by API 5CT, and having a tensile yield strength of 125 ksi (862 N/mm$^2$)).

In the FEM analysis, the material was modeled as an elastoplastic body exhibiting isotropic hardening, and having an elastic modulus of 210 [GPa] and a nominal yield strength of 125 [ksi] (=862 [MPa]) as 0.2% proof stress. In fastening, the pin was further rotated by 1.5/100 turns from a state in which shoulder surfaces of the pin and the box were brought into contact with each other.

[Evaluation Method]

In the FEM analysis, the model in a fastened state was sequentially subjected to load steps (an internal pressure, external pressure, tensile load, and compressive load) which simulated those in Series A test of ISO13679 2011 version. Contact forces [N/mm] of each of the inner seal portion and the outer seal portion in an internal pressure cycle (first and second quadrants) and an external pressure cycle (third and fourth quadrants) of a load step hysteresis were compared. The contact force of seal portion is a minimum value of "average contact surface pressure between the sealing surfaces"×"contact width", and the sealing performance of the seal portion becomes better as this value becomes higher. Sealing performance against internal pressure was evaluated from the contact force of the inner seal portion. And sealing performance against external pressure was evaluated from the contact force of the outer seal portion.

Extraction of the contact force of each of the inner seal portion and the outer seal portion is performed at each position of 0°, 90°, 180°, and 270° around the pipe axis.

[Results]

Figure 7A:
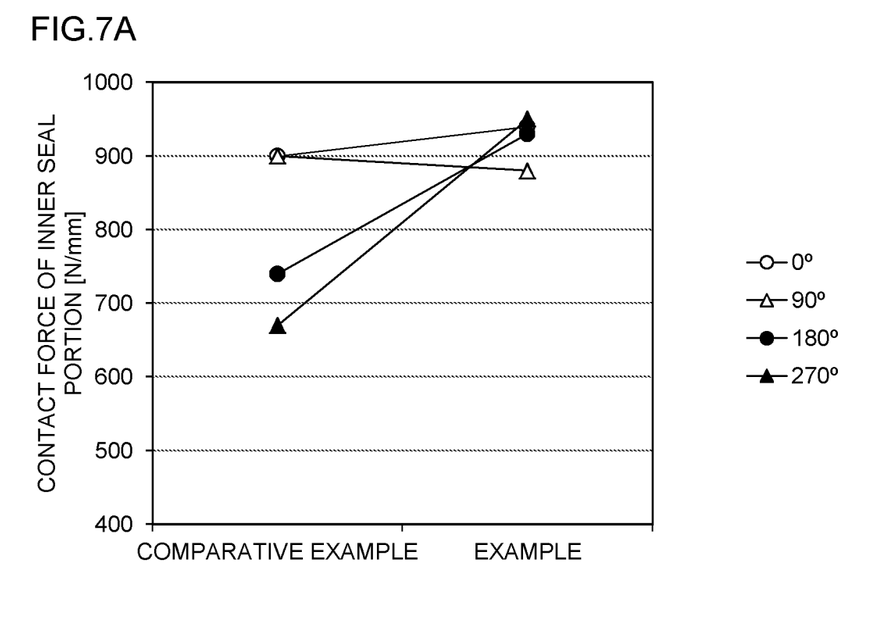
FIG. 7A is a diagram to show test results of the inner seal portion.
Figure 7B:
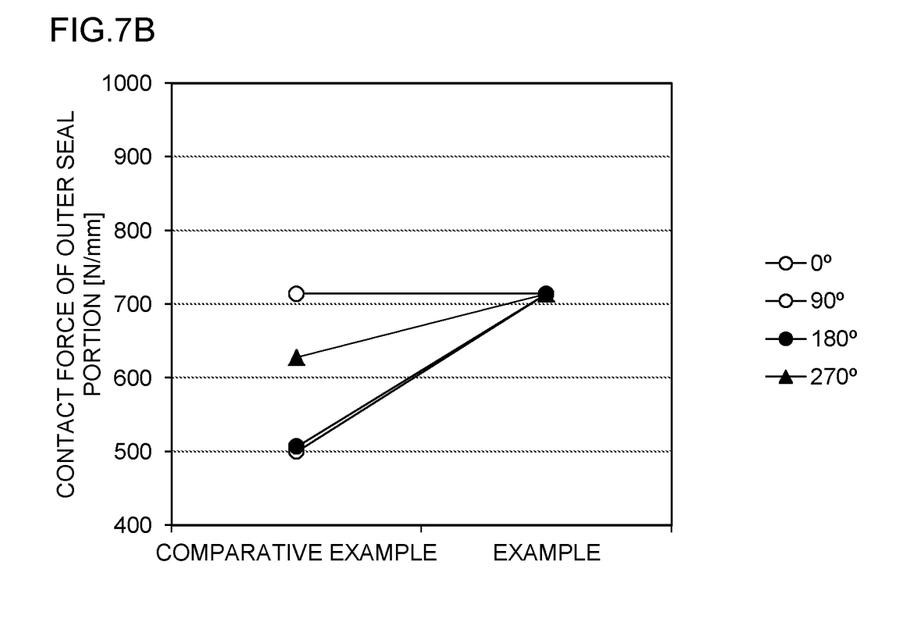
FIG. 7B is a diagram to show test results of the outer seal portion.

FIGS. 7A and 7B are diagrams to summarize the test results. Where, FIG. 7A shows results of the inner seal portion, and FIG. 7B shows results of the outer seal portion. As shown in FIG. 7A, variations in the contact force of the inner seal portion according to Example were smaller than those in the case of Comparative Example. As shown in FIG. 7B, variations in the contact force of the outer seal portion according to Example were smaller than those in the case of Comparative Example. These results proved that the threaded connection of the present embodiment can stably ensure sealing performance against internal pressure and external pressure.

INDUSTRIAL APPLICABILITY

The threaded connection of the present invention can be effectively applied to connecting of steel pipes used as oil country tubular goods.

REFERENCE SINGS LIST

10 Pin
11 Inner sealing surface

12 Inner male threaded portion
12a Crest
12b Root
12c Stabbing flank
12d Load flank
13 Shoulder portion
13a Shoulder surface
14 Outer male threaded portion
14a Crest
14b Root
14c Stabbing flank
14d Load flank
15 Outer sealing surface
16 Inner groove
20 Box
21 Inner sealing surface
22 Inner female threaded portion
22a Crest
22b Root
22c Stabbing flank
22d Load flank
23 Shoulder portion
23a Shoulder surface
24 Outer female threaded portion
24a Crest
24b Root
24c Stabbing flank
24d Load flank
25 Outer sealing surface
26 Outer groove

The invention claimed is:

1. A threaded connection for steel pipes comprising a tubular pin and a tubular box, wherein
the pin includes, in the order from a free end side of the pin toward a tubular body side thereof, an inner sealing surface, an inner male threaded portion, a shoulder portion, an outer male threaded portion, and an outer sealing surface,
the box includes, in the order from a tubular body side of the box to the free end side thereof, an inner sealing surface, an inner female threaded portion, a shoulder portion, an outer female threaded portion, and an outer sealing surface,
the threaded connection includes at least one of the following configurations (1) and (2):
(1) an inner groove along a circumferential direction is provided between the inner sealing surface and the inner female threaded portion of the box, and some threads of the inner male threaded portion of the pin are contained in the inner groove, the inner groove including at least one of a tapered surface that is adjacent to the inner sealing surface and decreases in diameter as the tapered surface extends to the inner sealing surface and a tapered surface that is adjacent to the inner female threaded portion and decreases in diameter as the tapered surface extends to the inner female threaded portion, and
(2) an outer groove along a circumferential direction is provided between the outer sealing surface and the outer male threaded portion of the pin, and some threads of the outer female threaded portion of the box are contained in the outer groove, the outer groove including at least one of a tapered surface that is adjacent to the outer sealing surface and decreases in diameter as the tapered surface extends to the outer sealing surface and a tapered surface that is adjacent to the outer male threaded portion and decreases in diameter as the tapered surface extends to the outer male threaded portion, and
the outer sealing surface of the pin and the outer sealing surface of the box are tapered.

2. The threaded connection for steel pipes according to claim 1, wherein
when the configuration (1) is provided, a length along a pipe axis of the inner groove of the box is larger than a thread pitch of the inner female threaded portion, and
when the configuration (2) is provided, a length along a pipe axis of the outer groove of the pin is larger than a thread pitch of the outer male threaded portion.

3. The threaded connection for steel pipes according to claim 2, wherein
when the configuration (1) is provided, the length along a pipe axis of the inner groove of the box is not more than 4 times of the thread pitch of the inner female threaded portion, and
when the configuration (2) is provided, the length along a pipe axis of the outer groove of the pin is not more than 4 times of the thread pitch of the outer male threaded portion.

4. The threaded connection for steel pipes according to claim 1, wherein
when the configuration (1) is provided, a depth of the inner groove of the box is not less than a thread height of the inner female threaded portion, and not more than twice the thread height, and
when the configuration (2) is provided, a depth of the outer groove of the pin is not less than a thread height of the outer male threaded portion, and not more than twice the thread height.

5. The threaded connection for steel pipes according to claim 1, wherein
an outer diameter of the box is not more than 110% of an outer diameter of the tubular body of the pin.

6. The threaded connection for steel pipes according to claim 1, wherein
a threaded portion consisting of the inner male threaded portion and the inner female threaded portion, and a threaded portion consisting of the outer male threaded portion and the outer female threaded portion are each a tapered thread of buttress type.

7. The threaded connection for steel pipes according to claim 6, wherein
each of the tapered threads includes crests, roots, stabbing flanks, and load flanks,
the crests of the inner male threaded portion and the roots of the inner female threaded portion are in contact with each other, and the load flanks of the inner male threaded portion and the load flanks of the inner female threaded portion are in contact with each other,
the roots of the outer male threaded portion and the crests of the outer female threaded portion are in contact with each other, and the load flanks of the outer male threaded portion and the load flanks of the outer female threaded portion are in contact with each other.

8. The threaded connection for steel pipes according to claim 1, wherein
regarding the inner groove, the tapered surface that is adjacent to the inner sealing surface has a taper angle not less than 1°, and the tapered surface that is adjacent to the inner female threaded portion has a taper angle not less than 5°.

9. The threaded connection for steel pipes according to claim 1, wherein regarding the inner groove, the tapered surface that is adjacent to the inner sealing surface has a taper angle not more than 50°, and the tapered surface that is adjacent to the inner female threaded portion has a taper angle not more than 45°.

10. The threaded connection for steel pipes according to claim 1, wherein regarding the outer groove, the tapered surface that is adjacent to the outer sealing surface has a taper angle not less than 1°, and the tapered surface that is adjacent to the outer male threaded portion has a taper angle not less than 5°.

11. The threaded connection for steel pipes according to claim 1, wherein regarding the outer groove, the tapered surface that is adjacent to the outer sealing surface has a taper angle not more than 50°, and the tapered surface that is adjacent to the outer male threaded portion has a taper angle not more than 45°.

* * * * *